(12) United States Patent
Brisbine et al.

(10) Patent No.: US 11,841,156 B2
(45) Date of Patent: Dec. 12, 2023

(54) BUILDING MANAGEMENT SYSTEM WITH NATURAL LANGUAGE INTERFACE

(71) Applicant: Honeywell International Inc., Charlotte, NC (US)

(72) Inventors: Patrick Brisbine, Mill Creek, WA (US); Kevin M. Callahan, Seattle, WA (US); John Geffe, Bellevue, WA (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 21 days.

(21) Appl. No.: 17/491,877

(22) Filed: Oct. 1, 2021

(65) Prior Publication Data

US 2022/0018565 A1   Jan. 20, 2022

Related U.S. Application Data

(63) Continuation of application No. 16/443,828, filed on Jun. 17, 2019, now abandoned.

(Continued)

(51) Int. Cl.
*G05B 19/042* (2006.01)
*F24F 11/56* (2018.01)
*G10L 15/22* (2006.01)

(52) U.S. Cl.
CPC ............ *F24F 11/56* (2018.01); *G05B 19/042* (2013.01); *G10L 15/22* (2013.01); *G05B 2219/25011* (2013.01); *G05B 2219/2614* (2013.01)

(58) Field of Classification Search
CPC .............. G05B 2219/25011; G05B 2219/2614
(Continued)

(56) References Cited

U.S. PATENT DOCUMENTS

| 4,598,397 A | 7/1986 | Nelson et al. |
| 5,086,385 A | 2/1992 | Launey et al. |

(Continued)

FOREIGN PATENT DOCUMENTS

| AU | 2017210578 A1 | 8/2017 |
| CN | 201225714 Y | 4/2009 |

(Continued)

OTHER PUBLICATIONS

"Icomfort Wi-Fi Thermostat: Touch Screen Programmable Communicating Thermostat," Lennox, 21 pages, Sep. 2012.

(Continued)

*Primary Examiner* — Hien D Khuu
(74) *Attorney, Agent, or Firm* — Seager, Tufte & Wickhem, LLP

(57) ABSTRACT

A building management system includes a controller that is configured to provide a natural language interaction on a remote user interface via an I/O port and to receive one or more building management requests from one or more users as well as to ascertain whether the received one or more building management requests can be carried out by the building management system. The one or more building system components of the building are instructed to carry out the received one or more building management requests unless one or more building management requests cannot be carried out, in which case one or more natural language messages on the remote user interface via the I/O port that informs the user that one or more of the building management requests cannot be carried out.

10 Claims, 6 Drawing Sheets

Related U.S. Application Data

(60) Provisional application No. 62/688,934, filed on Jun. 22, 2018.

(58) Field of Classification Search
USPC .......................................................... 700/276
See application file for complete search history.

(56) References Cited

U.S. PATENT DOCUMENTS

| | | | |
|---|---|---|---|
| 6,052,666 A | 4/2000 | Diehl et al. | |
| 6,408,272 B1 | 6/2002 | White et al. | |
| 6,413,079 B1 | 7/2002 | Lyons et al. | |
| 6,988,070 B2 | 1/2006 | Kawasaki et al. | |
| 7,031,438 B1 | 4/2006 | Cheston, III et al. | |
| 7,403,838 B2 | 7/2008 | Deen et al. | |
| 7,447,635 B1 | 11/2008 | Konopka et al. | |
| 7,720,683 B1 | 5/2010 | Vermeulen et al. | |
| 7,831,426 B2 | 11/2010 | Bennett | |
| 7,933,777 B2 | 4/2011 | Koll | |
| 7,957,974 B2 | 6/2011 | Cho et al. | |
| 8,321,444 B2 | 9/2012 | Mowatt et al. | |
| 8,340,975 B1 | 12/2012 | Rosenberger | |
| 8,346,794 B2 | 1/2013 | Cheng et al. | |
| 8,396,710 B2 | 3/2013 | White et al. | |
| 8,630,742 B1 | 1/2014 | Stefanski et al. | |
| 8,666,963 B2 | 3/2014 | Sejnoha et al. | |
| 8,818,789 B2 | 8/2014 | Abir | |
| 8,831,957 B2 | 9/2014 | Taubman et al. | |
| 8,868,428 B2 | 10/2014 | Gruenstein et al. | |
| 9,058,390 B2 | 6/2015 | Barve et al. | |
| 9,472,205 B2 | 10/2016 | Kolavennu et al. | |
| 9,495,962 B2 | 11/2016 | Govrin et al. | |
| 9,542,956 B1 | 1/2017 | Nostrant | |
| 9,851,728 B2 * | 12/2017 | Matsuoka | F24F 11/30 |
| 9,875,741 B2 | 1/2018 | Gelfenbeyn et al. | |
| 10,042,338 B2 | 8/2018 | Cifteli et al. | |
| 10,145,579 B2 | 12/2018 | Stoner et al. | |
| 10,360,304 B1 | 7/2019 | Alvarez et al. | |
| 2002/0034956 A1 | 3/2002 | Mekuria | |
| 2002/0069063 A1 | 6/2002 | Buchner et al. | |
| 2003/0088642 A1 | 5/2003 | Price et al. | |
| 2003/0093272 A1 | 5/2003 | Soufflet et al. | |
| 2003/0187659 A1 | 10/2003 | Cho et al. | |
| 2004/0019489 A1 | 1/2004 | Funk et al. | |
| 2004/0193603 A1 | 9/2004 | Jubicich | |
| 2005/0149496 A1 | 7/2005 | Mukherjee et al. | |
| 2006/0142880 A1 | 6/2006 | Deen et al. | |
| 2007/0256435 A1 | 11/2007 | Koyama | |
| 2007/0286181 A1 | 12/2007 | Bushmitch et al. | |
| 2007/0288129 A1 | 12/2007 | Komer et al. | |
| 2008/0147397 A1 | 6/2008 | Konig et al. | |
| 2008/0175261 A1 | 7/2008 | Wang | |
| 2008/0233983 A1 | 9/2008 | Park et al. | |
| 2009/0143918 A1 | 6/2009 | Amundson et al. | |
| 2009/0204410 A1 | 8/2009 | Mozer et al. | |
| 2010/0030734 A1 | 2/2010 | Chunilal | |
| 2010/0223055 A1 | 9/2010 | McLean | |
| 2010/0286985 A1 | 11/2010 | Kennewick et al. | |
| 2010/0332235 A1 | 12/2010 | David | |
| 2011/0046792 A1 | 2/2011 | Imes et al. | |
| 2012/0059658 A1 | 3/2012 | Sejnoha et al. | |
| 2012/0066286 A1 | 3/2012 | Heredia et al. | |
| 2012/0123561 A1 | 5/2012 | Park et al. | |
| 2012/0158161 A1 | 6/2012 | Cohn et al. | |
| 2012/0232886 A1 | 9/2012 | Capuozzo et al. | |
| 2013/0006400 A1 | 1/2013 | Caceres et al. | |
| 2013/0031476 A1 | 1/2013 | Coin et al. | |
| 2013/0117395 A1 | 5/2013 | Buschmitch et al. | |
| 2013/0138250 A1 * | 5/2013 | Mowery | G05D 23/1917 700/276 |
| 2013/0183944 A1 | 7/2013 | Mozer et al. | |
| 2014/0058567 A1 | 2/2014 | Matsuoka et al. | |
| 2014/0163751 A1 | 6/2014 | Davis et al. | |
| 2014/0223465 A1 | 8/2014 | Hatambeiki et al. | |
| 2014/0033056 A1 | 11/2014 | Venkatesha et al. | |
| 2014/0330435 A1 * | 11/2014 | Stoner | F24F 11/30 700/275 |
| 2014/0330569 A1 | 11/2014 | Kolavennu et al. | |
| 2014/0379323 A1 | 12/2014 | Anastasakos et al. | |
| 2015/0053781 A1 | 2/2015 | Nelson et al. | |
| 2015/0088518 A1 | 3/2015 | Kim et al. | |
| 2015/0142180 A1 * | 5/2015 | Matsuoka | G05B 19/048 700/276 |
| 2015/0277681 A1 | 10/2015 | Isaacson et al. | |
| 2015/0348551 A1 | 12/2015 | Gruber et al. | |
| 2016/0091217 A1 | 3/2016 | Verberkt et al. | |
| 2016/0095189 A1 | 3/2016 | Vangeel et al. | |
| 2016/0335264 A1 | 11/2016 | Behal et al. | |
| 2016/0377305 A1 * | 12/2016 | Kwa | F24F 11/79 700/277 |
| 2016/0378080 A1 | 12/2016 | Uppala et al. | |
| 2017/0024465 A1 | 1/2017 | Yeh et al. | |
| 2017/0161268 A1 | 6/2017 | Badaskar | |
| 2017/0163435 A1 | 6/2017 | Ehsani et al. | |
| 2018/0024520 A1 | 1/2018 | Sinha et al. | |
| 2018/0031265 A1 * | 2/2018 | Janniello | F24F 11/30 |
| 2018/0061213 A1 | 3/2018 | Morehead | |
| 2018/0129181 A1 | 5/2018 | Kratzer, III et al. | |
| 2018/0266718 A1 * | 9/2018 | Gillette | F24F 11/64 |
| 2018/0299840 A1 * | 10/2018 | Sinha | G05B 13/048 |
| 2018/0313566 A1 | 11/2018 | Nemcek et al. | |
| 2018/0347840 A1 | 12/2018 | Nelson et al. | |
| 2018/0367484 A1 | 12/2018 | Rodriguez et al. | |
| 2019/0072290 A1 * | 3/2019 | Stoner | F24F 11/58 |
| 2019/0130915 A1 | 5/2019 | Nitz et al. | |
| 2019/0147883 A1 | 5/2019 | Mellenthin et al. | |
| 2019/0353379 A1 | 11/2019 | Lee et al. | |
| 2021/0080139 A1 * | 3/2021 | Brown | G05B 13/048 |
| 2021/0223750 A1 * | 7/2021 | Joshi | G06Q 10/103 |
| 2021/0381861 A1 * | 12/2021 | Brown | G05D 27/02 |

FOREIGN PATENT DOCUMENTS

| | | |
|---|---|---|
| CN | 101947788 A | 1/2011 |
| CN | 202092667 U | 12/2011 |
| CN | 102332204 A | 1/2012 |
| CN | 102436273 A | 5/2012 |
| CN | 107062528 A * | 8/2017 |
| EP | 1054387 A2 | 11/2000 |
| EP | 1119191 A2 | 7/2001 |
| EP | 0986808 B1 | 2/2002 |
| EP | 1260886 A2 | 11/2002 |
| EP | 1135757 B1 | 11/2006 |
| EP | 1345360 B1 | 12/2006 |
| EP | 1415218 B1 | 2/2011 |
| EP | 2738478 A2 | 6/2014 |
| EP | 2738478 A3 | 8/2014 |
| EP | 2801972 A1 | 12/2014 |
| GB | 2094508 A | 9/1982 |
| JP | 3803045 B2 | 8/2006 |
| JP | 2006208460 A | 8/2006 |
| JP | 2006317573 A | 11/2006 |
| JP | 4503310 B2 | 7/2010 |
| JP | 2010181064 A | 8/2010 |
| JP | 4533844 B2 | 9/2010 |
| JP | 2010236759 A | 10/2010 |
| JP | 4640178 B2 | 3/2011 |
| JP | 4839605 B2 | 12/2011 |
| KR | 20100026353 A | 3/2010 |
| KR | 20110012048 A | 2/2011 |
| KR | 20110045314 A | 5/2011 |
| KR | 20120017492 A | 2/2012 |
| KR | 101151571 B1 | 5/2012 |
| WO | 9313507 A1 | 7/1993 |
| WO | 9855992 A1 | 12/1998 |
| WO | 9934339 A2 | 7/1999 |
| WO | 2006126192 A2 | 11/2006 |
| WO | 2007101164 A2 | 9/2007 |
| WO | 2008018102 A2 | 2/2008 |
| WO | 2009107211 A1 | 3/2009 |

(56) References Cited

FOREIGN PATENT DOCUMENTS

| WO | 2009147927 A1 | 12/2009 |
|---|---|---|
| WO | 2014124353 A1 | 8/2014 |

OTHER PUBLICATIONS

The Extended European Search Report for EP Application No. 14806841.4, dated Jan. 24, 2017.
"Kelvin Talking Thermostat," Accenda Products, 2 pages, Dec. 9, 2013.
"Kelvin Installation Manual," Action Talking Products LLC, vol. 1.5, 8 pages, 2004, 2005.
U.S. Appl. No. 14/737,076, "User Interaction with Building Controller Device Using a Remote Server and a Duplex Connection," Filed Jun. 11, 2015.
"A Thermostat that Speaks to a Consumer's Needs", Storify, 3 pages, Jul. 14, 2015.
"Automated Living Control," HAL, 1 page, Dec. 9, 2013.
"Voice IR Environmental Voice Controller," Broadened Horizons, 17 pages, Dec. 9, 2013.
Brown et al., "Joint DOD Industry Study on Opportunities in Integrated Diagnostics," 110 pages, Jan. 1990.
"Comfort System VVTIII," Carrier, 6 pages, Aug. 1996.
Caravalho et al., "Voice Thermostat Remote Control," The Institute of Electrical and Electronics Engineers, Inc. 4 pages, 1999.
"CEM 24 Series," Systems Controls and Instruments, LLC, 32 pages, Jan. 2010.
"Hints for Homeowners A Thermostat That Speaks to a Consumers Needs," Coleman, 1 page, date accessed, Jun. 26, 2019.
Walters, "Siri hack allows voice control of home thermostat," 2 pages, Nov. 21, 2011.
"SiriProxy-Nest Learning Thermostat," GitHubchilitechno, 3 pages, Jan. 6, 2014.
"SiriProxy," GithubPlamoni, 7 pages, Dec. 9, 2013.
"P7600A Network Compatible Computer Room Air Conditioning (CRAC) Program Module for W7600 Control Module," Honeywell, 72 pages, 1993.
"Voice Recognition & Voice Interactive Products," Innotech Systems Inc., 1 page, Dec. 9, 2013.
Jacobson, "Design: A Voice Activated Thermostat," Biomedical Sciences Instrumentation, vol. 28, 6 pages, 1992.
"Assistive Technology Transfer Update," Kohler, vol. 1, Issue 1 (Spring) 2 pages, 1999.
Lacquet et al., "An Affordable Digital-Display-to-Natural-Voice Converter for Visually Impaired Radio Amateurs," IEEE Transactions on Rehabilitation Engineering, vol. 4 (4): 6 pages, Dec. 1996.
Lee et al., "Fault Detection in an Air-Handling Unit Using Residual and Recursive Parameter Identification Methods," ASHRAE Transactions, vol. 102, Pt. 1, 12 pages, 1996.
Lopez et al., "Temperature and Humidity Laboratory Remote Controller," Journal of the Mexican Society of Instrumentation, vol. 3: (6), pp. 14-20, Jun. 1996.
Miles et al., "An Audible Thermostat for the Blind or Visually Challenged," IEEE, pp. 68-69, 1997.
International Search Report and Written Opinion for Application No. PCT/US2013/039326. 5 pages, dated, Aug. 6, 2013.
Piette et al., "Model-Based Chiller Energy Tracking for Performance Assurance at a University Building," Environmental Energy Technologies Division, pp. 1-13, Sep. 1997.
"Telephone Controlled Thermostat," RCI Automation LLC, 4 pages, Dec. 9, 2013.
"Talking Thermostat Model VT3000 User's Guide," SmartWay Solutions, Inc., pp. 1-20, accessed on Jun. 25, 2019.
"Stargate Interactive Automation System," JDS Technologies, 9 pages, May 9, 2013.
"Accessible Thermostat" T2RERC Rehabilitation Engineering Research Center on Technology Transfer, pp. 1-40, accessed on Jun. 25, 2019.
Watt, "Development of Empirical Temperature and Humidity-Based Degraded Condition Indicators for Low-Tonnage Air Conditioners," A Thesis, The Office of Graduate Studies of Texas A&M University, 205 pages, Dec. 1997.
"Comfort Call Owners Manual," Venstar Inc., 23 pages, Aug. 2007.
"Talking Thermostats for Persons who are Blind," The Ezra Group, LLC 3 pages, Dec. 12, 2013.
Watt et al., "Predictive Maintenance Programs (PMP's) in Small HVAC Applications: Analysis of Available Products and Technology," Texas Engineering Experiment Station, 4 pages, Apr. 1994.
"VIP 3000 Residential Talking Thermostat That Promotes Independent Living," The Ezra Group LLC, 2 pages, date accessed Jun. 26, 2019.
Segran, "Introducing The First Voice-Activated Hotel Room," Fast Company, Business and Innovation, 7 pages, Aug. 24, 2016.
International Search Report and Written Opinion for PCT/US2018/014930, dated May 8, 2018.
The European Search Report for EP Application No. 14165437.6, dated Aug. 7, 2014.
Dreilinger et al., "Experiences with Selecting Search Engines Using Metasearch," ACM Transactions on Information Systems, vol. 15, No. 3, pp. 195-222, Jul. 1997.
http://federatedsearchblog.com/2009/01/30/steven-bell-on-the-future-of-federated-search/, "Steven Bell on the Future of Federated Search," 3 pages, printed Feb. 7, 2017.
https://en.wikipedia.org/wiki/Federated_search, "Federated Search, From Wikipedia, the Free Encyclopedia," 4 pages, printed Feb. 7, 2017.
https://en.wikipedia.org/wiki/Search_aggregator, "Search Aggregator, From Wikipedia, the Free Encyclopedia," 2 pages, printed Mar. 27, 2017.
EP19181562, European Search Report, pp. 8, Dec. 12, 2019.
European Extended Search Report, EP Application No. 19181562.0, Dec. 19, 2021 (8 pages).

\* cited by examiner

BUILDING MANAGEMENT SYSTEM WITH NATURAL LANGUAGE INTERFACE

RELATED APPLICATION

This application is a continuation of co-pending U.S. patent application Ser. No. 16/443,828, filed Jun. 17, 2019, entitled BUILDING MANAGEMENT SYSTEM WITH NATURAL LANGUAGE INTERFACE, which claims the benefit of U.S. Provisional Application Ser. No. 62/688,934 filed Jun. 22, 2018, entitled BUILDING MANAGEMENT SYSTEM WITH NATURAL LANGUAGE INTERFACE, both of which are incorporated herein by reference.

TECHNICAL FIELD

The present disclosure pertains generally to systems for managing building systems and more particularly to systems for managing a HVAC system within a building.

BACKGROUND

Building control systems are often used to help control a building's environment, such as the temperature, humidity, air quality, lighting, security and other aspects of a building's environment. An example building control system may include a Heating, Ventilation, and/or Air Conditioning (HVAC) system used to control the comfort level within a building. Another example building control system may include a lighting controller that controls the lighting in the building. Another example building control system may include a security system controller that controls the security of the building.

Many building control systems have a master or central building controller. Such a building controller may have a user interface for allowing designated users to interact with the building controller. In some cases, some users may be restricted as to the kinds of changes that they can make to the operation of the building control system. For example, a tenant or occupant of a building may be more restricted as to the kinds of changes that can be made relative to, for example, a facility management staff member. What would be desirable is a system and method that allows occupants of a building to interact with a building control system in an easy and intuitive manner, and in some cases, get the facility management staff involved when necessary.

SUMMARY

The disclosure relates generally to systems for managing operation of building control systems. In a particular example of the disclosure, a building management system is configured to control the operation of one or more building system components of a building. The building management system includes an I/O port for operative coupling to a remote user interface as well as a controller that is operatively coupled to the I/O port. The controller is configured to provide a natural language interaction on the remote user interface via the I/O port and to receive one or more building management requests from one or more users as well as to ascertain whether the received one or more building management requests can be carried out by the building management system. The controller is further configured to instruct the one or more building system components of the building to carry out the received one or more building management requests unless one or more building management requests cannot be carried out, whereby the controller provides one or more natural language messages on the remote user interface via the I/O port that informs the user that one or more of the building management requests cannot be carried out by the building management system.

In another example of the disclosure, an HVAC management system is configured to control operation of one or more HVAC system components of a building. The HVAC management system includes an I/O port for operative coupling to a remote user interface and a controller that is operatively coupled to the I/O port. The controller is configured to provide a natural language interaction on the remote user interface via the I/O port and to receive one or more HVAC comfort requests from one or more users, to determine an HVAC operational parameter change in response to one or more of the HVAC comfort requests and to instruct the one or more HVAC system components to institute the determined HVAC operational parameter change for a period of time, and then to return to a previous setting for the HVAC operational parameter.

In another example of the disclosure, an HVAC management system is configured to control operation of one or more HVAC system components of a building. The HVAC management system includes an I/O port for operative coupling to a remote user interface and a controller that is operatively coupled to the I/O port. The controller is configured to provide a natural language interaction on the remote user interface via the I/O port and to receive one or more HVAC comfort requests from one or more users, to determine a location of the user within the building that is making one or more of the HVAC comfort requests, to determine an HVAC operational parameter change for a specific HVAC zone from a plurality of HVAC zones that corresponds to the determined location of the user that is making one or more of the HVAC comfort requests and to instruct the one or more HVAC system components to institute the determined HVAC operational parameter change in the specific HVAC zone.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
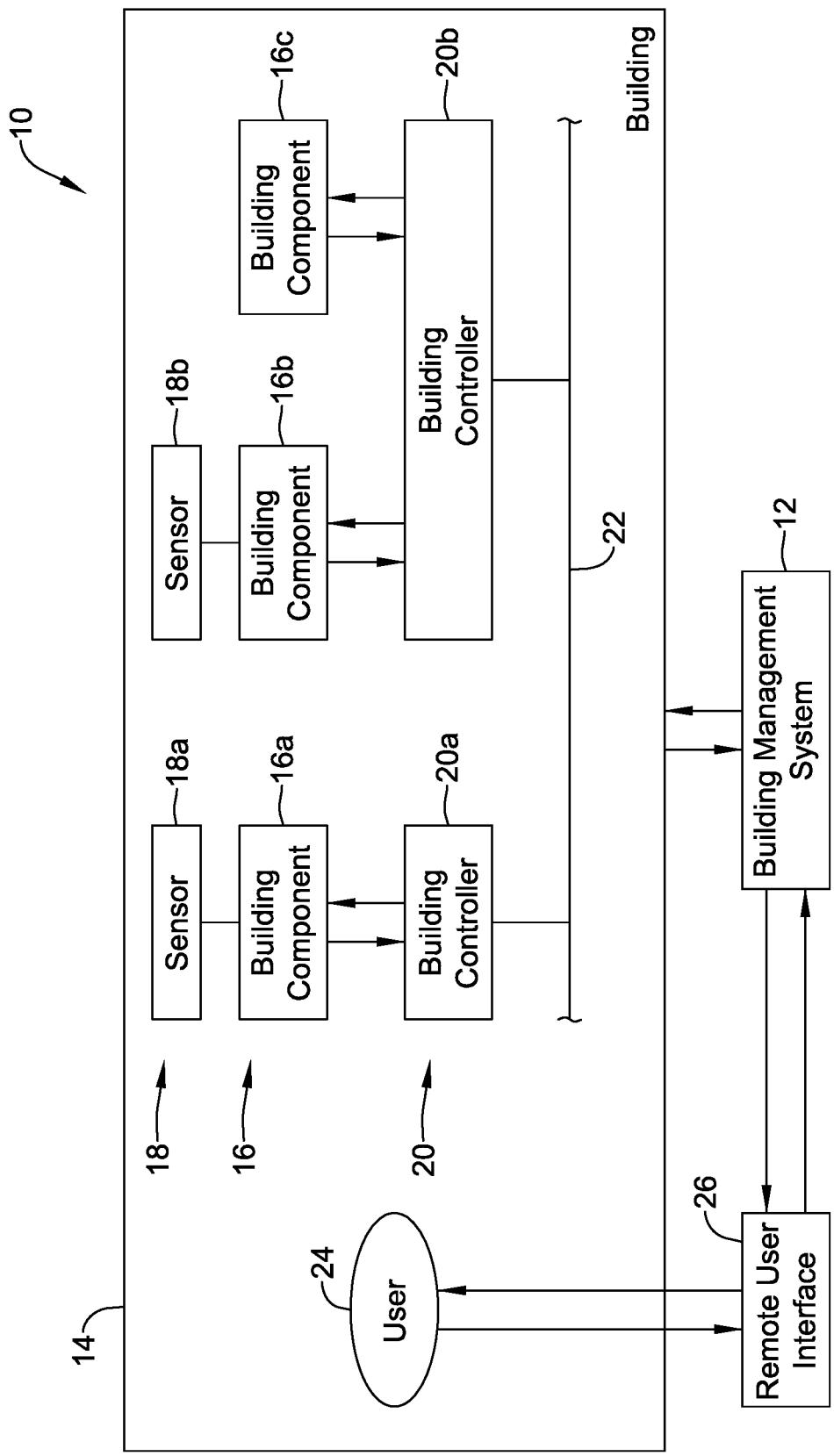
FIG. 1 is a schematic block diagram of a building employing an illustrative building management system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of a building system 10 that may utilize an illustrative building management system 12 in controlling at least some operational features of a building 14. As illustrated, the building 14 includes a building component 16a, a building component 16b and a building component 16c. It will be appreciated that the building 14 may include any number of building components 16, and that the three shown are merely illustrative. It will also be appreciated that the building components 16 may generally represent various HVAC components, security system components, lighting system components, and the like. In some cases, the building components 16 may be operably coupled via a wired or a wireless connection to corresponding sensors 18. Depending on the function of the building components 16, the corresponding sensors 18 may be temperature sensors, occupancy sensors and the like. As illustrated, a sensor 18a is operably coupled to the building component 16a and a sensor 18b is operably coupled to the building component 16b. In some cases, one or more sensors may be coupled directly to a building controller, such as building controller 20a.

In some cases, one or more building controllers 20 may control at least some functions and/or operation of the building components 16. For example, a building controller 20a may be operably coupled to the building component 16a while a building controller 20b may be operably coupled to the building component 16b and to the building component 16c. This is just an example, as a particular building controller 20 may control functions and/or operation of any number of the building components 16. In some instances, as shown, the building controllers 20 may be operably coupled to a building network 22, but this is not required in all instances.

A user 24 may be disposed within the building 14. It will be appreciated that while one user 24 is shown, the building 14 may include any number of different users 24. In some cases, the user 24 (or one or more of a plurality of users 24) may desire a change in operation of one or more of the building components 16. For example, the user 24 may desire to alter operation of a security system, such as but not limited to turning the security system on or off, or perhaps canceling a false alarm. The user 24 may desire to make changes in a global lighting scheme within the building 14, or perhaps just change the lighting in their particular portion of the building 14. In some cases, the user 24 may feel uncomfortable, expressing for example that they feel cold, or that they feel hot. The user 24 may express that their particular portion of the building 14 is stuffy, and thus is in need of ventilation. Accordingly, the user 24 may express a desire for, for example, cool air, warm air, and/or fresh air, among other things.

The user 24 may indicate their desire for a change in operation of one or more of the building components 16 by using a remote user interface 26. In this, "remote" indicates that the remote user interface 26 is remote, or at a different location, from a building management system 12. The building management system 12 may be at a particular location within the building or outside of the building such as in the cloud. The building management system 12 may provide a centralized control function for the building system 10. The remote user interface 26 may be accessible to the user 24 from within the building 14. For example, the remote user interface 26 may be manifested within an application running on a smartphone of the user 24. In some cases, the remote user interface 26 may be a chat bot running on a computer that the user 24 is using (at the user's desk). The remote user interface 26 may be a textual interface, or may utilize voice recognition. In some cases, the remote user interface 26 may receive voiced statements from the user 24, and in response the remote user interface 26 may talk back to the user 24 in an interactive manner. These are just examples.

Figure 2:
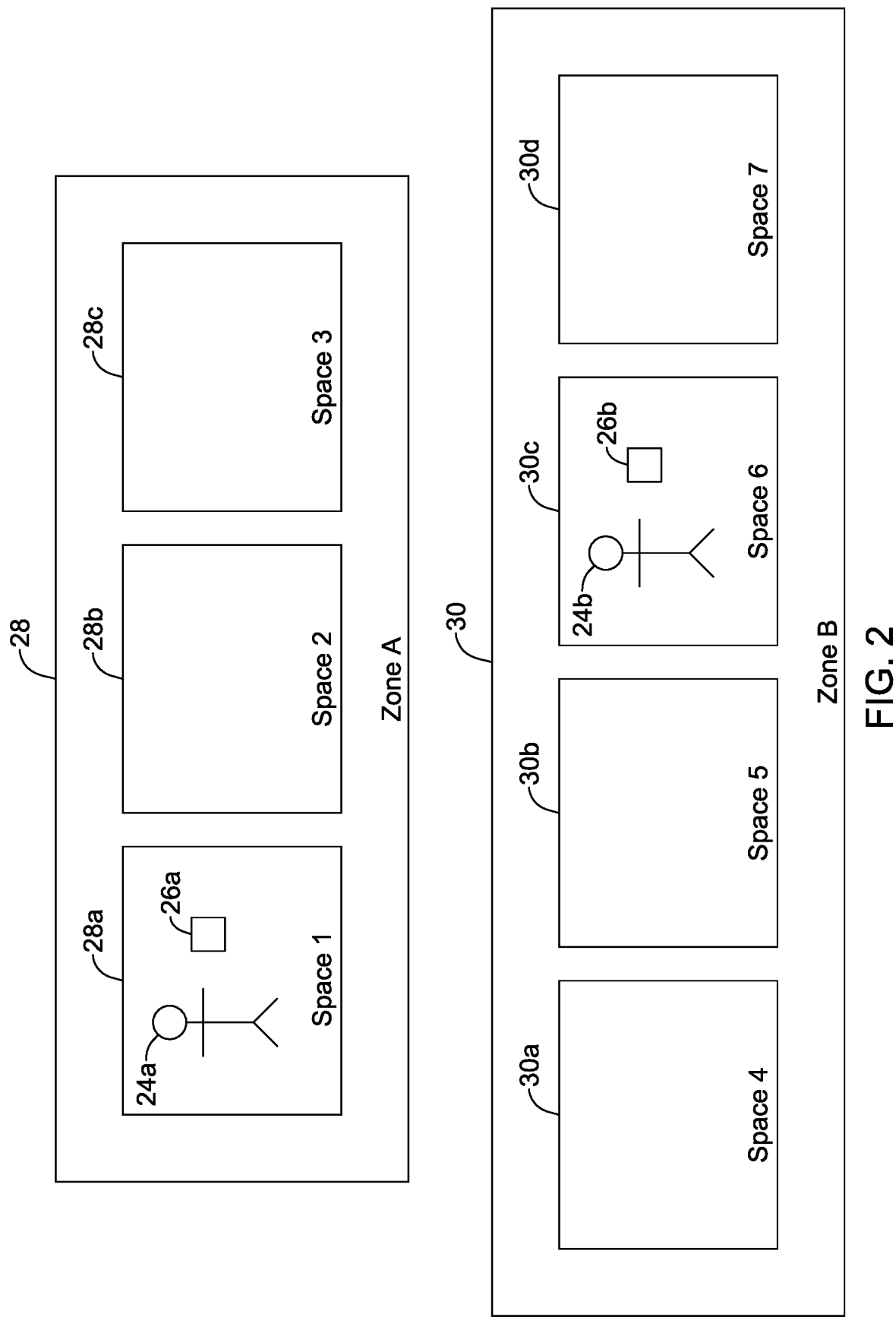
FIG. 2 is a schematic block diagram of a portion of a building illustrating zones within the building.

FIG. 2 is a schematic illustration of a portion of the building 14, showing a ZONE A labeled as 28, and a ZONE B labeled as 30. The ZONE A may for example include a total of three spaces, including a SPACE 1 labeled as 28a, a SPACE 2 labeled as 28b and a SPACE 3, labeled as 28c. The ZONE B may for example include a total of four spaces, including a SPACE 4 labeled as 30a, a SPACE 5 labeled as 30b, a SPACE 6 labeled as 30c and a SPACE 7 labeled as 30d. The number of spaces in each zone 28, 30 is merely illustrative, as each zone 28, 30 may include any number of spaces. In an office setting, the spaces may correspond to offices, conference rooms or other spaces, as desired. As shown, a user 24a is currently located in SPACE 1 labeled as 28a, while another user 24b is currently located in SPACE 6 labeled as 30c. The user 24a has access to a remote user interface 26a and the user 24b has access to a remote user interface 26b. The remote user interface 26a and the remote user interface 26b may independently display a chat bot running on the respective user's computer, or perhaps an application running on the respective user's smartphone.

It will be appreciated that various conditions, including lighting and environmental conditions such as temperature and ventilation may vary from zone to zone, or even within various portions of a single zone. It will also be appreciated that individual users 24 may have differing preferences. Perhaps the user 24a is always cold, while the user 24b is always hot, for example. Accordingly, the building management system 12 (FIG. 1) enables the user 24a to send to the building management system 12, via the remote user interface 26a, a message that they are uncomfortable, perhaps saying "I am cold", or "It's too cold in here". Similarly, the user 24b is able to send to the building management system 12, via the remote user interface 26b, a message that they are uncomfortable, perhaps saying "I am hot", or "It's too warm in here".

In some cases, before determining what, if anything, to do in response, the building management system 12 may determine the location of the user 24 issuing a comfort request. In the example shown in FIG. 2, perhaps the SPACE 1 labeled as 28a is actually the assigned office for the user 24a, while the SPACE 6 labeled as 30c is a conference room, and is not the assigned office for the user 24b. Regardless of which space the user 24 is currently in, it is recognized that users move around, and thus it may not be appropriate to make assumptions as to their current location. In some cases, the specific remote user interface 26 may have a network address, for example, which identifies its location. In other cases, beacons placed around the space may be used to identify the location of a user's smart phone or an RFID tag in a user's badge. These are just examples.

In some cases, the building management system 12 may create a natural language interaction on the remote user interface 26 in order to ascertain the current location of the user. In some instances, the building management system 12 may instead ask one or more questions of the user via the remote user interface 26, such as "Are you at your desk?", or "What is your name?", or perhaps "Are you in the conference room?", or "Are you in the lunchroom?". It will be appreciated that these examples are merely illustrative, and are not intended to be limiting in any manner.

Figure 3:
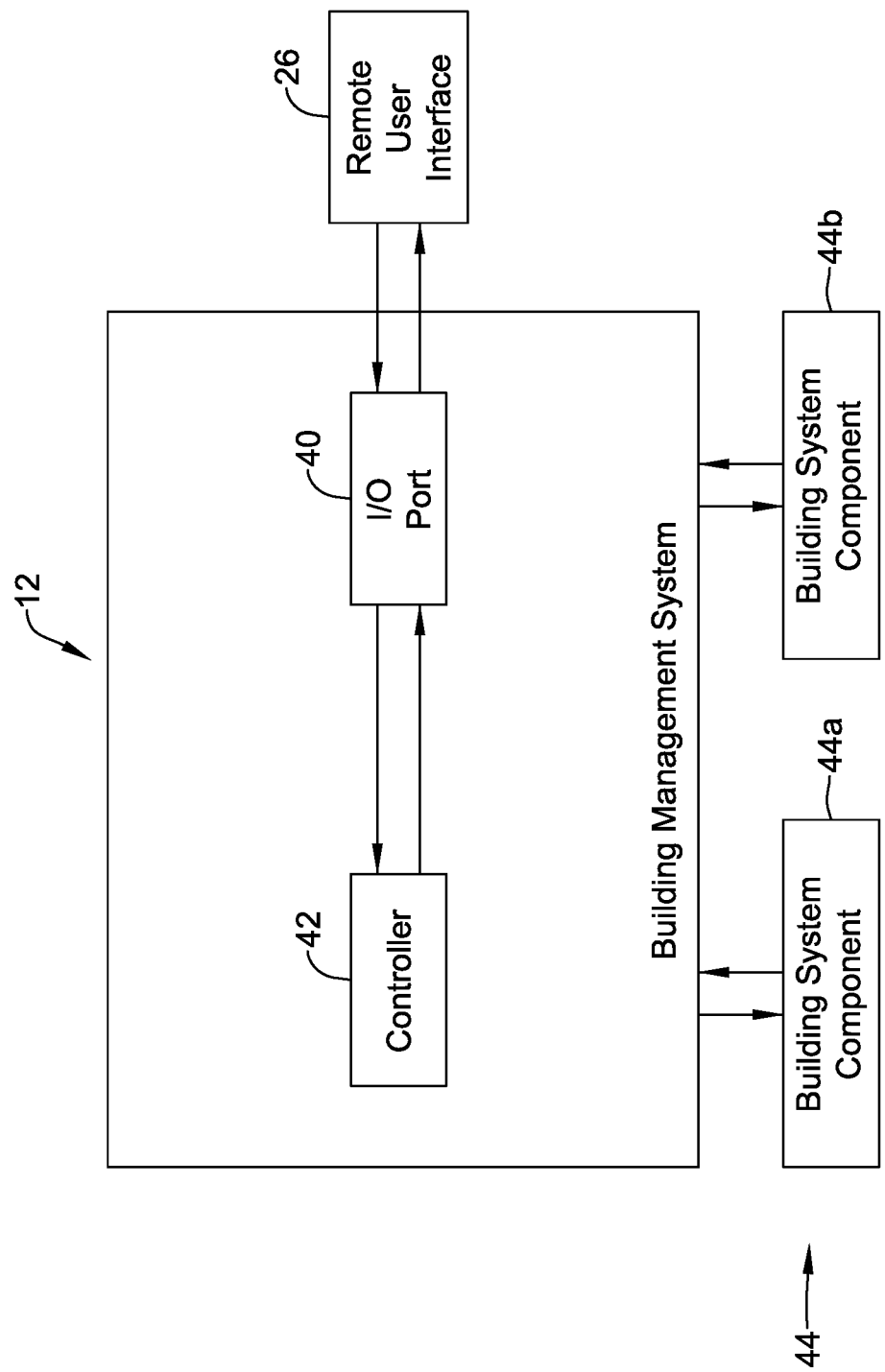
FIG. 3 is a schematic block diagram of an illustrative building management system.

FIG. 3 is a schematic block diagram of an illustrative building management system 12 that may be configured to control the operation of one or more building system components 44a-44b of the building 14. In some cases, as shown, the illustrative building management system 12 may include an I/O port 40 that is configured to be operatively coupled to the remote user interface 26 and a controller 42 that is operatively coupled to the I/O port 40. In some cases, the controller 42 is configured to provide a natural language interaction on the remote user interface 26 via the I/O port 40 and to receive one or more building management requests from one or more users 24. As illustrated, there is a building system component 44a and a building system component 44b. In some cases, there may be only one building system component 44a, or there may be three, four or more distinct building system components 44a-44b. The building system components 44a-44b may represent lighting system components, security system components, and/or HVAC components.

In some cases, the controller 42 may be configured to ascertain whether the one or more building management requests received from the users can actually be carried out by the building management system 12. There are a variety of reasons that a particular building management request could not be carried out. For example, the controller 42 may determine that one or more of the building management requests cannot be carried out due to a building system component equipment fault. In other words, one or more of the building system components 44a-44b may not be working properly. In some cases, if there is a building system component fault, the controller 42 may be configured to provide an alert via the I/O port to a building manager regarding the one or more building management requests that cannot be carried out due to the building system component equipment fault(s).

As another example, the controller 42 may determine that one or more of the received building management requests cannot be carried out due to a conflict with another one of the received building management requests. This might occur, for example, if one user 24 says "I am cold" while another user 24, who is in the same zone, or even in the same office, says "I am hot".

As another example, the controller 42 may determine that one or more of the received building management requests cannot be carried out because doing so would result in a building system parameter being outside of a predefined allowable range. In some cases, if the building components 44a-44b are HVAC components currently set in a heating mode, a user request that would require air conditioning may not be able to be carried out. As another example, if there is an allowable temperature range, in the heating mode, of 65 to 78 degrees, and the current temperature is already 78 degrees, any further increase would violate the allowable temperature range.

The controller 42 may be further configured to instruct the building system components 44a-44b of the building 14 to carry out the received one or more building management requests unless the one or more building management requests cannot be carried out, whereby the controller 42 provides one or more natural language messages on the remote user interface via the I/O port that informs the user that the one or more of the building management requests cannot be carried out by the building management system 12. In some cases, the controller 42 may be configured to institute a temporary change in operation of the building system components 44a-44b in response to one or more of the building management requests, and then to return the one or more building system components 44a-44b after a predetermined period of time. In other cases, the controller 42 may be configured to institute a permanent change (e.g. until a user changes again) in operation of the building system components 44a-44b in response to one or more of the building management requests.

In some cases, the controller 42 may be configured to enable a user to create an event via the remote user interface 26 by specifying one or more comfort parameters for a zone within the building 14 and a date and time of the created event, and once created, the controller 42 may be configured to instruct the building system components 44a-44b that correspond to the zone to operate in accordance with the one or more comfort parameters at the date and time of the created event. For example, a user at a school may create an event for the gym on the following Friday from 3:00-4:00 PM, and the controller 42 may instruct the building system components that correspond to the gym to operate in accordance with occupied comfort parameters on Friday from 3:00-4:00 PM. The occupied comfort parameters may predefined and may be more comfortable but less energy efficient than un-occupied parameters.

In some cases, the controller 42 may be configured to automatically learn one or more future operations of the building system components 44a-44b based on one or more received building management requests from the user. For example, in some cases, the controller 42 may be configured to execute a learning algorithm that schedules a learned event in the future operation of one or more building system components based on one or more of the received building management requests from the user. For example, a particular user 24 may express "I am cold" every day after lunch. The controller 42 may learn this, and automatically increase a temperature set point each day at 1 pm in a particular zone corresponding to the location of the particular user 24. In another example, the controller 42 may learn that a large number of users congregate in the lunch room each day around 9 am for a coffee break, and the corresponding collective body heat causes one or more users 24 each day to express "I am hot" at that time. Accordingly, the controller 42 may learn to drop the temperature in the lunch room starting each day at 8:30 am. These are just examples.

Figure 4:
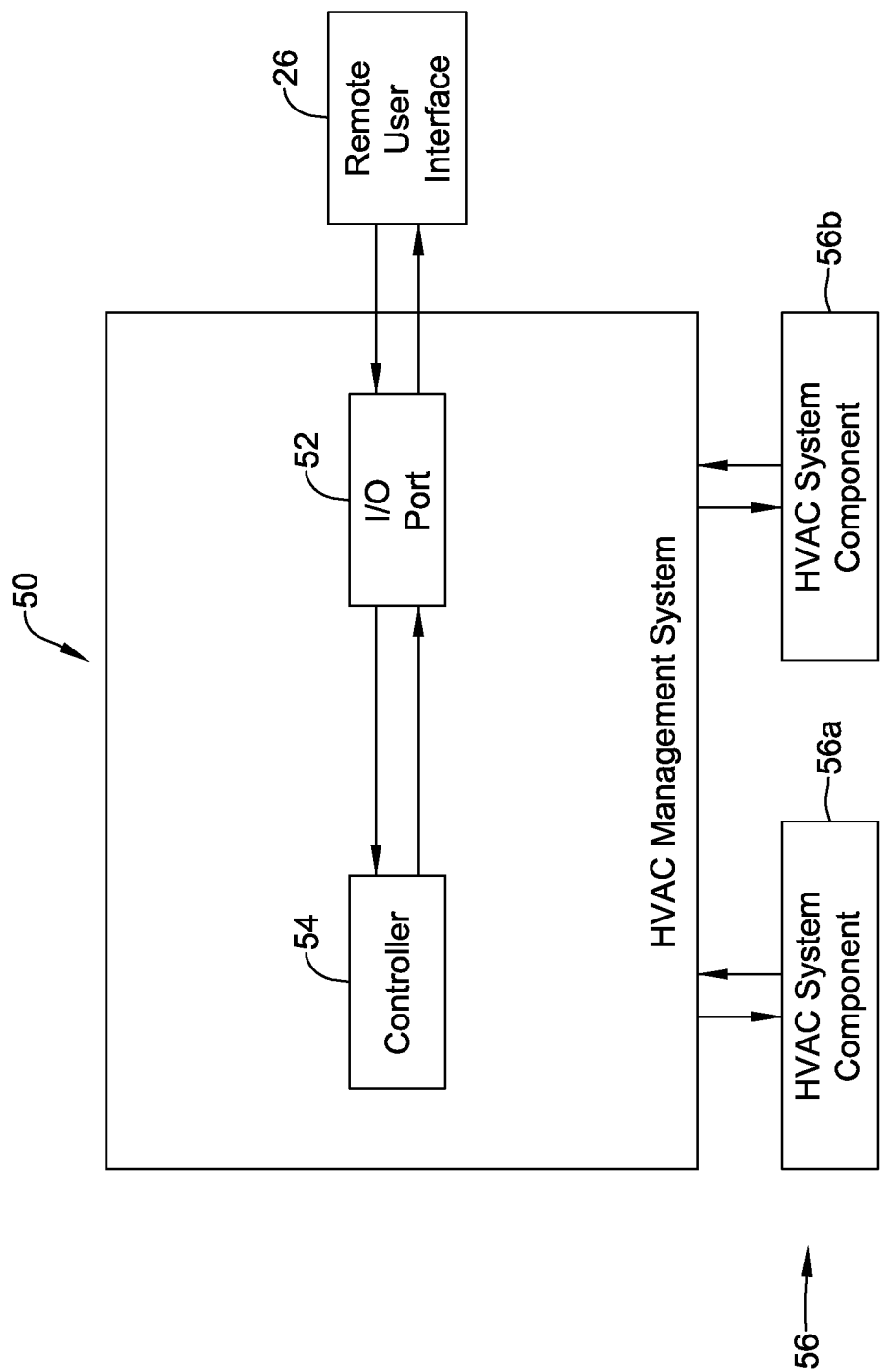
FIG. 4 is a schematic block diagram of an illustrative HVAC management system.

FIG. 4 is a schematic block diagram of an illustrative HVAC management system 50 that is configured to control operations of one or more HVAC system components of a building. The illustrative HVAC management system 50 includes an I/O port 52 for operative coupling to the remote user interface 26 as well as a controller 54 that is operatively coupled to the I/O port 52. In some cases, the controller 54 may be configured to provide a natural language interaction on the remote user interface 26 via the I/O port 52 and to receive one or more HVAC comfort requests from one or more users. HVAC comfort requests may include a request for cooler air, for warmer air and/or for fresh air. In some instances, HVAC comfort requests may simply include statements such as "I am cold", "I am hot", "I feel stuffy" and the like.

The controller 54 may be configured to determine an HVAC operational parameter change in response to one or more of the HVAC comfort requests and to instruct the one or more HVAC system components 56 to institute the determined HVAC operational parameter change. In some cases, the determined HVAC operational parameter change is instituted for a period of time, and then returned to the previous setting for the HVAC operational parameter. While an HVAC system component 56a and an HVAC system component 56b are illustrated, it will be appreciated that there may be a single HVAC system component 56, or a plurality of HVAC system components 56. In some cases, at least some of the HVAC system components 56 may be variable air volume (VAV) boxes.

In some cases, the controller 54 may be configured to communicate with the one or more HVAC system components 56 in order to confirm that the determined HVAC operational parameter change is being executed. The period of time during which the determined HVAC operational parameter change is instituted and in effect may be an adjustable time period. For example, the period of time may default to a relatively short period of time, say ten minutes or twenty minutes. However, if a particular user is making a request for a new change shortly after the previous change expired, the controller 54 may automatically lengthen the period of time in order to reduce the number of requests and/or to improve the comfort of that particular user, as long as accommodating that particular user isn't contrary to other user's comfort requests.

Figure 5:
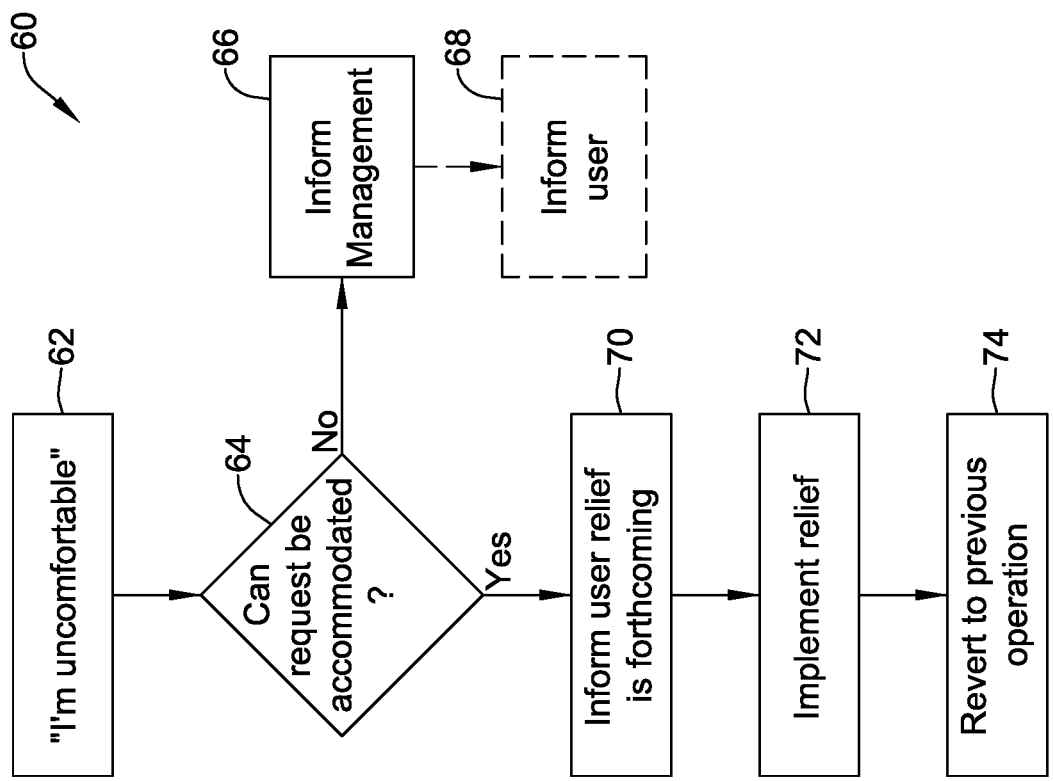
FIG. 5 is a flow diagram showing an illustrative method that may be carried out by the illustrative HVAC management system of FIG. 4.

FIG. 5 is a flow diagram showing an illustrative method 60 that may be carried out by the illustrative HVAC management system 50 (FIG. 4). At block 62, a statement that a user is uncomfortable is received and understood. This may be an indication that the user is cold, or that the user is too warm, for example. At decision block 64, there is a determination made as to whether the received request can be accommodated. In some cases, for example, this may include equipment readiness and/or the nature of the received request. If the request cannot be accommodated, a message to that effect may be sent to building management personnel, as indicated at block 66. In some cases, the user may also be informed, as indicated at block 68. If the decision is made that the request can be carried out, control passes to block 70, and the user is informed that relief is forthcoming. This may simply be a message such as "OK, we can do that" or something to that effect. At block 72, the relief (cooler air or warmer air) is implemented for a period of time. Once that period of time is up, control passes to block 74 and the system returns to its previous operation.

Figure 6:
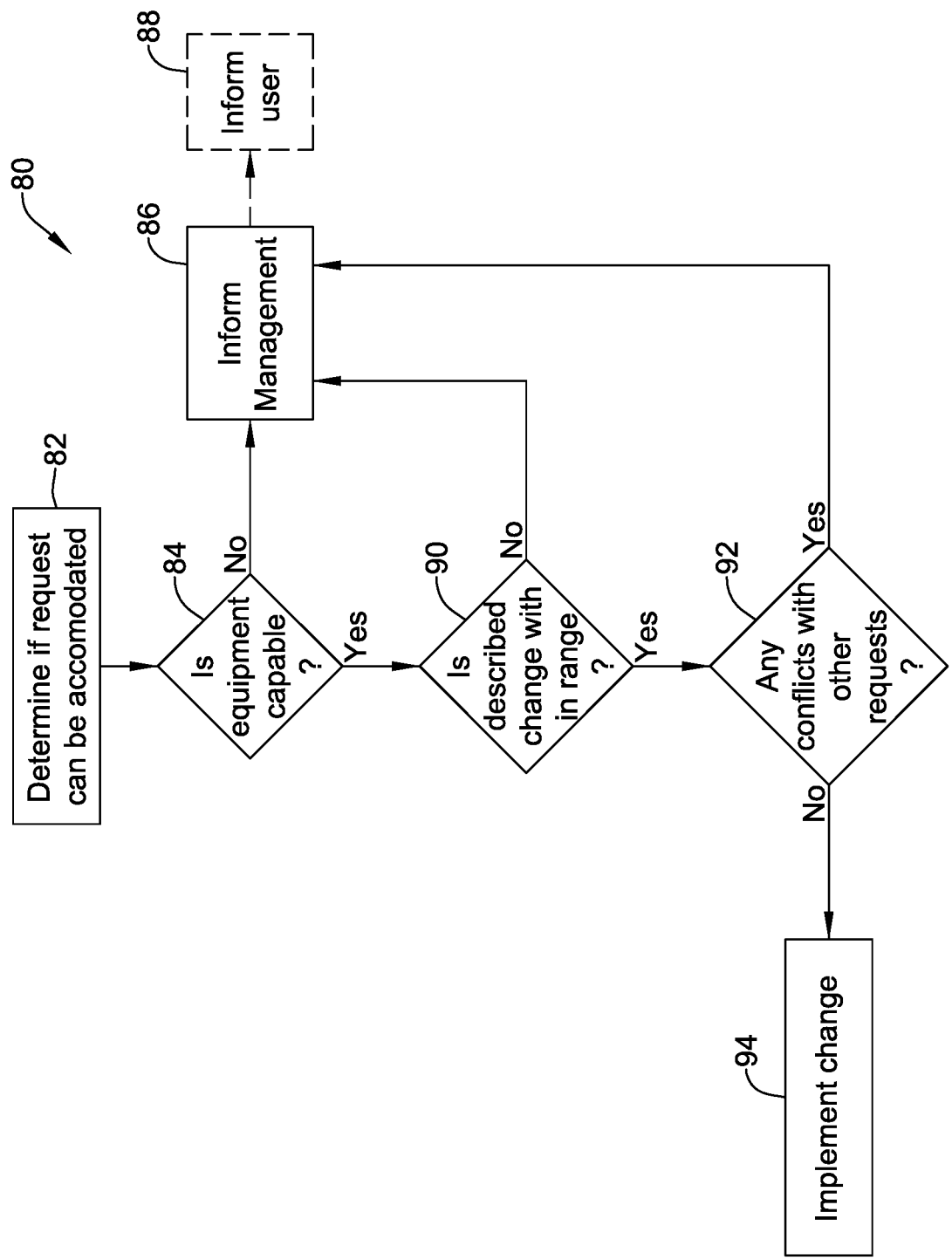
FIG. 6 is a flow diagram showing an illustrative method that may be carried out by the illustrative HVAC management system of FIG. 4.

FIG. 6 is a flow diagram showing an illustrative method 80 that may be carried out by the illustrative HVAC management system 50 (FIG. 4). The illustrative method 80 may be considered as presenting some of the details considered within the decision block 64 (FIG. 5). At decision block 84, a determination is made as to whether the HVAC equipment is capable of carrying out the request. This may involve checking for any equipment faults, for example. If not, control passes to block 86 where management is informed, and optionally to block 88 where the user is informed. If the determination is yes, however, control passes to decision block 90, where a determination is made as to whether the requested change is within an allowable range. If not, control reverts to block 86. Otherwise, if yes, control passes to decision block 92, where a determination is made as to whether the requested change conflicts with any other requested changes. If so, control reverts to block 86. If not, control passes to block 94 and the change is implemented. In some cases, the implementation is temporary.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. An HVAC management system configured to control operation of one or more HVAC system components of a building, the HVAC management system comprising:
   an I/O port for operative coupling to a plurality of remote user interfaces each associated with one of a plurality of users;
   a controller operatively coupled to the I/O port, the controller configured to:
      provide a natural language interaction on the remote user interfaces via the I/O port, and in at least one of the natural language interactions, receive two or more HVAC comfort requests from one or more of the plurality of users;
      determine an HVAC operational parameter change in response to one or more of the HVAC comfort requests;
      determine whether the two or more of the HVAC comfort requests conflict;
      when it is determined that a particular one of the two or more HVAC comfort requests does not conflict with another one of the two or more HVAC comfort requests, the controller is configured to:
         instruct the one or more HVAC system components to institute the HVAC operational parameter change determined for the particular one of the two or more HVAC comfort requests for a period of time, and then to return to a previous setting for the HVAC operational parameter;
         wherein the period of time during which the determined HVAC operational parameter change is in effect comprises an adjustable time period, and wherein the controller is configured to adjust the adjustable time period in response to a history of the two or more HVAC comfort requests;

when it is determined that the particular one of the two or more HVAC comfort requests does conflict with another one of the two or more HVAC comfort requests, the controller is configured to:

not instruct the one or more HVAC system components to carry out the particular one of the two or more HVAC comfort requests; and send an alert to the remote user interface associated with the user that requested the particular one of the two or more HVAC comfort requests that the particular HVAC comfort request will not be carried out because of a conflict with another one of the two or more HVAC comfort requests.

2. The HVAC management system of claim 1, wherein the controller is configured to determine whether the particular one of the two or more HVAC comfort requests can be accommodated by determining whether the one or more HVAC system components are capable of carrying out the particular one of the two or more HVAC comfort requests.

3. The HVAC management system of claim 2, wherein the controller is configured to determine whether the particular one of the two or more HVAC comfort requests can be accommodated by determining whether the HVAC operational parameter change determined for the particular one of the two or more HVAC comfort requests is within an allowed range.

4. The HVAC management system of claim 1, wherein the controller is configured to communicate with the one or more HVAC system components in order to confirm that the determined HVAC operational parameter change is being executed.

5. The HVAC management system of claim 1, wherein the one or more HVAC system components include a variable air volume (VAV) box.

6. The HVAC management system of claim 1, wherein at least one of the two or more HVAC comfort requests comprises a statement that the corresponding user is too cold or too warm.

7. An HVAC management system configured to control operation of one or more HVAC system components of a building, the HVAC management system comprising:

an I/O port for operative coupling to a plurality of remote user interfaces each associated with one of a plurality of users;

a controller operatively coupled to the I/O port, the controller configured to:

provide a natural language interaction on the remote user interface via the I/O port, and in at least one of the natural language interactions, receive one or more HVAC comfort requests from one or more users;

determine a location of the user within the building that is making one or more of the HVAC comfort requests;

determine an HVAC operational parameter change for a specific HVAC zone from a plurality of HVAC zones that corresponds to the determined location of the user that is making one or more of the HVAC comfort requests; and determine whether each of the one or more of the HVAC comfort requests can or cannot be accommodated by performing at least two of:

determine whether the one or more HVAC system components are not capable of carrying out the respective HVAC comfort request;

determine whether the HVAC operational parameter change determined for the respective HVAC comfort request is not within an allowed range; and determine whether the respective HVAC comfort request is in conflict with one or more other HVAC comfort requests;

when it is determined that a respective one of the one or more HVAC comfort requests can be accommodated, the controller is configured to:

instruct the one or more HVAC system components to institute the HVAC operational parameter change determined for the respective HVAC comfort request in the specific HVAC zone for a period of time, and then to return to a previous setting for the HVAC operational parameter in the specific HVAC zone, wherein the period of time during which the determined HVAC operational parameter change is in effect in the specific HVAC zone comprises an adjustable time period that is based at least in part on a history of one or more HVAC comfort requests; and when it is determined that a respective one of the one or more HVAC comfort requests cannot be accommodated, the controller is configured to:

not instruct the one or more HVAC system components to carry out the respective HVAC comfort requests.

8. The HVAC management system of claim 7, wherein the controller is configured to determine whether each of the one or more of the HVAC comfort requests can or cannot be accommodated by:

determining whether the HVAC operational parameter change determined for the respective HVAC comfort request is not within an allowed range; and determining whether the respective HVAC comfort request is in conflict with one or more other HVAC comfort requests.

9. The HVAC management system of claim 7, wherein the HVAC comfort requests from the one or more users comprise a statement that the user is too cold or too warm.

10. A method for controlling operation of one or more HVAC system components of a building, the method comprising:

receiving a natural language utterance from a user;

determining one or more HVAC comfort requests based at least in part on the natural language utterance;

determining an HVAC operational parameter change in response to one or more of the HVAC comfort requests;

determining whether the one or more HVAC comfort requests can be accommodated or not, wherein the one or more HVAC comfort requests cannot be accommodated when the particular HVAC operational parameter change determined for the particular HVAC comfort request is not within a predefined allowed range, wherein:

when a particular HVAC comfort request can be accommodated, instructing the one or more HVAC system components to institute the corresponding HVAC operational parameter change for a period of time, and then to return to a previous setting for the HVAC operational parameter;

when the particular HVAC comfort request cannot be accommodated:

not instructing the one or more HVAC system components to institute the corresponding HVAC operational parameter change for the period of time;

sending an alert to the user that is associated with the particular HVAC comfort request that the particular HVAC comfort request cannot be accommodated; and sending an alert to a facility manager that the particular HVAC comfort request cannot be accommodate.

* * * * *